United States Patent
Oberpriller et al.

(10) Patent No.: US 12,078,725 B2
(45) Date of Patent: Sep. 3, 2024

(54) NON-CONTACT MOTION DETECTION SENSOR UTILIZING DISTANCE AND INTENSITY STATISTICS

(71) Applicant: Banner Engineering Corp., Minneapolis, MN (US)

(72) Inventors: Wade Oberpriller, Minneapolis, MN (US); Kathryn Grant Phillips Longley, Minneapolis, MN (US)

(73) Assignee: BANNER ENGINEERING CORP., Minneapolis, MN (US)

( * ) Notice: Subject to any disclaimer, the term of this patent is extended or adjusted under 35 U.S.C. 154(b) by 128 days.

(21) Appl. No.: 17/654,010

(22) Filed: Mar. 8, 2022

(65) Prior Publication Data

US 2022/0291382 A1    Sep. 15, 2022

Related U.S. Application Data

(60) Provisional application No. 63/158,697, filed on Mar. 9, 2021.

(51) Int. Cl.
*G01S 17/58* (2006.01)
*B65G 13/00* (2006.01)
(Continued)

(52) U.S. Cl.
CPC ............ *G01S 17/58* (2013.01); *G01S 7/4814* (2013.01); *G01S 7/4816* (2013.01);
(Continued)

(58) Field of Classification Search
None
See application file for complete search history.

(56) References Cited

U.S. PATENT DOCUMENTS 649,833 A    5/1900  Gillespie
4,258,250 A  3/1981  Schmidt
(Continued)

FOREIGN PATENT DOCUMENTS

CN    107861113 B    1/2020
DE    202014007924 U9  5/2015
(Continued)

OTHER PUBLICATIONS

Christian Fiebach, Optical sensors, 2014 (Year: 2014).*
(Continued)

*Primary Examiner* — Yuqing Xiao
*Assistant Examiner* — Jempson Noel
(74) *Attorney, Agent, or Firm* — Thompson Patent Law Offices PC

(57) ABSTRACT

Apparatus and associated methods relate to detecting jams when an intensity of a reflected signal exceeds a predetermined intensity threshold and an intensity window metric based on historic intensity value(s) fails to exceed an intensity window threshold for more than a predetermined time threshold. In an illustrative example, a jam detection unit (JDU) may emit a signal and detect a reflection of the signal. The JDU may, for example, compare intensity of the reflected signal to the intensity threshold. The JDU, for example, may compare the intensity threshold with at least one historic intensity value to determine the intensity window metric. If the intensity value exceeds the intensity threshold and the intensity window metric has not exceeded the intensity window threshold for longer than the time threshold, then the JDU may, for example, generate a jam signal. Various embodiments may advantageously detect jams based on intensity of a reflected signal.

20 Claims, 8 Drawing Sheets

(51) Int. Cl.
*G01S 7/481* (2006.01)
*G01S 7/497* (2006.01)
*G01S 17/06* (2006.01)
*G01S 17/42* (2006.01)
*G01S 17/89* (2020.01)

(52) U.S. Cl.
CPC ............ *G01S 7/4972* (2013.01); *G01S 17/06* (2013.01); *G01S 17/42* (2013.01); *G01S 17/89* (2013.01); *B65G 13/00* (2013.01); *B65G 2203/0233* (2013.01); *B65G 2203/044* (2013.01)

(56) References Cited

U.S. PATENT DOCUMENTS

| | | | |
|---|---|---|---|
| 5,073,706 | A | 12/1991 | Kulju |
| 5,496,996 | A * | 3/1996 | Barnes ............... G01V 8/10 250/223 B |
| 5,914,785 | A | 6/1999 | Allison et al. |
| 5,970,433 | A | 10/1999 | Oka et al. |
| 6,018,159 | A * | 1/2000 | Alderman ............ G01V 8/22 209/524 |
| 6,157,040 | A | 12/2000 | Bauer |
| 6,498,333 | B1 | 12/2002 | Christensen |
| 6,927,385 | B2 | 8/2005 | Adamietz et al. |
| 7,638,753 | B2 | 12/2009 | Merettig |
| 8,820,741 | B2 | 9/2014 | Hongo et al. |
| 8,857,815 | B2 | 10/2014 | Hongo et al. |
| 9,477,220 | B2 | 10/2016 | Shteinfeld et al. |
| 10,630,869 | B1 * | 4/2020 | Forsythe .............. G06T 7/254 |
| 10,977,800 | B1 | 4/2021 | Hay et al. |
| 2005/0230603 | A1 * | 10/2005 | Langland .............. G01V 8/14 250/221 |
| 2006/0144899 | A1 | 7/2006 | Hu et al. |
| 2006/0187441 | A1 | 8/2006 | Sugiyama et al. |
| 2009/0121886 | A1 | 5/2009 | Klaus et al. |
| 2012/0019832 | A1 | 1/2012 | Momtahan |
| 2012/0235929 | A1 | 9/2012 | Hongo et al. |
| 2012/0312956 | A1 | 12/2012 | Chang et al. |
| 2012/0327287 | A1 | 12/2012 | Meyers et al. |
| 2013/0083316 | A1 | 4/2013 | Mimeault et al. |
| 2014/0374569 | A1 | 12/2014 | Fuhr |
| 2015/0098087 | A1 * | 4/2015 | Stecker ................ G01V 8/10 356/448 |
| 2015/0329296 | A1 * | 11/2015 | Shteinfeld .......... G05B 19/4189 73/865.8 |
| 2016/0091861 | A1 | 3/2016 | Liu et al. |
| 2016/0298809 | A1 * | 10/2016 | Lutz ..................... G01V 8/20 |
| 2018/0120424 | A1 | 5/2018 | Eshel et al. |
| 2018/0275310 | A1 | 9/2018 | Hörsch et al. |
| 2018/0284321 | A1 * | 10/2018 | Lindmark ............. G01V 8/22 |
| 2019/0049581 | A1 | 2/2019 | Waslowski |
| 2019/0285751 | A1 | 9/2019 | Hall et al. |
| 2020/0018836 | A1 | 1/2020 | Nakamura et al. |
| 2021/0009359 | A1 | 1/2021 | Polak et al. |
| 2021/0118154 | A1 | 4/2021 | Oberpriller et al. |
| 2022/0291384 | A1 | 9/2022 | Oberpriller |

FOREIGN PATENT DOCUMENTS

| | | |
|---|---|---|
| DE | 202014103348 U1 | 10/2015 |
| EP | 0819950 A1 | 1/1998 |
| EP | 2348331 A1 | 7/2011 |
| EP | 3188461 A1 | 7/2017 |
| EP | 2447739 B1 | 9/2018 |
| GB | 2214027 A | 8/1989 |
| WO | 2022192876 A1 | 9/2022 |

OTHER PUBLICATIONS

Avago Technologies, "Optical Mouse Sensors." Avago Technologies, 2007, [Online]. https://media.digikey.com/pdf/Data%20Sheets/Avago%20PDFs/ToolKitSelectionGuide.pdf.

Banner Engineering Corp., "LH Series: High Precision Laser Measurement Sensor," n.d. https://www.bannerengineering.com/us/en/products/sensors/laser-distance-measurement/highprecision-laser-measurement-sensors-lh-series.html?sort=4#all (accessed Aug. 31, 2020).

Banner Engineering Corp., "Q4X Laser Distance Sensor: The Ultimate Problem Solver," n.d. https://www.bannerengineering.com/in/en/products/new-products/laser-distance-sensorq4x.html (accessed Aug. 31, 2020).

Earl, B. Calibrating Sensors. Mar. 21, 2020. https://learn.adafruit.com/calibratingsensors/single-point-calibration.

Keyence, "Best Detection Ability in its Class" LR-Z series Self-contained CMOS Laser Sensor, Sep. 2013, https://www.keyence.com/products/sensor/photoelectric/lr-z/features/feature-02.jsp.

Lezhin, et al "Comparison of Different Methods of Non-contact Vibration Measurement," Procedia Engineering, vol. 176, pp. 175-183, 2017, doi: 10.1016/j.proeng.2017.02.286.

Omron, Overview of Photoelectric Sensors | Omron Industrial Automation, Jan. 27, 2022, https://www.ia.omron.com/support/guide/43/introduction.html.

S. Alavi, "Comparison of Some Motion Detection Methods in cases of Single and Multiple Moving Objects," International Journal of Image Processing, vol. 6, No. 5, pp. 389-396, 2012, [Online]. Available: https://www.researchgate.net/publication/306357420_Comparison_of_Some_Motion_Detection_Methods_in_cases_of_Single_and_Multiple_Moving_Objects.

Tripathy, et al, "Adaptive Threshold Background Subtraction for Detecting Moving Object on Conveyor Belt," International Journal of Students' Research in Technology & Management, vol. 5, No. 4, pp. 46-51, Nov. 2017, doi: 10.18510/ijsrtm.2017.546.

Chapter II Demand and Replacement Claims filed in related International Application No. PCT/US2022/071037, dated Dec. 23, 2022, 26 pages.

Informal Communication in related International Application No. PCT/US2022/071037, dated Jan. 1, 2023, 5 pages.

International Preliminary Report on Patentability in related International Application No. PCT/US2022/071037, dated Jun. 16, 2023, 8 pages.

Examiner's Report in related Canada Application No. 3,207,228, dated Sep. 14, 2023, 4 pages.

International Search Report and Written Opinion of the International Searching Authority in related International Application No. PCT/US2022/071037, dated May 20, 2022, 11 pages.

* cited by examiner

NON-CONTACT MOTION DETECTION SENSOR UTILIZING DISTANCE AND INTENSITY STATISTICS

CROSS-REFERENCE TO RELATED APPLICATIONS

This application claims the benefit of U.S. Provisional Application Ser. No. 63/158,697, titled "Non-Contact Motion Detection Sensor Utilizing Distance and Intensity Statistics," filed by Oberpriller, et al., on Mar. 9, 2021.

This application incorporates the entire contents of the foregoing application(s) herein by reference.

The subject matter of this application may have common inventorship with and/or may be related to the subject matter of the following:
- U.S. application Ser. No. 17/072,028, titled "Image-Based Jam Detection," filed by Wade Oberpriller, et al., on Oct. 15, 2020;
- U.S. Application Ser. No. 62/916,087, titled "Imaging System Using Triangulation," filed by Wade Oberpriller, et al., on Oct. 16, 2019;
- U.S. Application Ser. No. 62/924,020, titled "Imaging System Using Triangulation," filed by Wade Oberpriller, et al., on Oct. 21, 2019; and,
- U.S. application Ser. No. 17/303,061, titled "Pixel Domain Field Calibration of Triangulation Sensors," filed by Wade Oberpriller on May 19, 2021.

This application incorporates the entire contents of the foregoing application(s) herein by reference.

TECHNICAL FIELD

Various embodiments relate generally to non-contact motion detection.

BACKGROUND

Conveyor belts typically transport objects from a first location to a second desired location. Many different types of conveyor belts exist. For example, conveyor belts may consist of surfaces that include rollers, wheels, belts that may be webbed or textured, or some other surface that would easily enable the movement of materials or objects from one place to another.

Some conveyor belt monitoring systems may monitor the progress of objects on a conveyor belt. Specifically, conveyor belt monitoring systems may determine whether objects being carried by the conveyor belt are flowing (e.g., advancing freely), or whether the object flow is jammed (e.g., stopped, and no longer advancing as intended). In some cases, the determination of object flow on the conveyor belt may involve direct human intervention by a user. For example, the user may directly observe the objects as they move along the belt from one point to another. In other cases, the monitoring of object flow may be done by a camera-based system that records the movement of the objects as they are transported along the conveyor belt.

The objects being transported may be varied. As may be observed from the perspective of a conveyor belt monitoring system located at an observation point, objects on the conveyor belt may, in various applications, present various form factors and/or diverse outline profiles. For example, some objects may present a quasi-continuous stream of objects scattered across the conveyor belt, with intermittent gaps that may appear in a non-deterministic distribution of spacings between objects, for example. In some applications, objects may be distributed along the conveyor in a substantially regular or uniform (e.g., deterministic) manner. On some conveyor systems, the shape profiles and/or orientations of monitored objects may be uniform or non-uniform, such as individual boxes of varying sizes and shapes, or continuous and uniform, such as a long roll of paper or paper towels.

SUMMARY

Apparatus and associated methods relate to detecting jams when an intensity of a reflected signal exceeds a predetermined intensity threshold and an intensity window metric based on historic intensity value(s) fails to exceed an intensity window threshold for more than a predetermined time threshold. In an illustrative example, a jam detection unit (JDU) may emit a signal and detect a reflection of the signal. The JDU may, for example, compare intensity of the reflected signal to the intensity threshold. The JDU, for example, may compare the intensity threshold with at least one historic intensity value to determine the intensity window metric. If the intensity value exceeds the intensity threshold and the intensity window metric has not exceeded the intensity window threshold for longer than the time threshold, then the JDU may, for example, generate a jam signal. Various embodiments may advantageously detect jams based on intensity of a reflected signal.

Various embodiments may achieve one or more advantages. For example, in an exemplary aspect, a cost-competitive and economical advantage results from using a minimal amount of hardware for jam detection. For example, a single electromagnetic (e.g., optical) signal source, such as a laser triangulation sensor, may advantageously launch a linear optical beam that illuminates a target object being transported by a conveyor system and generates a detection signal as a function of a reflection of the linear optical beam off the target object and incident on a corresponding detection surface. The detection signal may indicate whether the object is jammed or moving. Such embodiments may, by way of example and not limitation, advantageously achieve detection results with little hardware (e.g., with an optical imaging source, which may include a laser and linear imager for a measurement of intensity and/or distance and a processing engine). In some embodiments, steps of a method may advantageously provide for image processing to determine motion based on comparing intensity and/or distance to one or more predetermined thresholds.

In some embodiments, a sensor may, for example, advantageously discriminate between acceptable motion and a jam state where minimal distance variations occur. For example, embodiments incorporating intensity measurements may accurately determine no jam state exists for large objects moving past, with minimal distance variation from the sensor, based on variations in intensity measured over time (e.g., due to labeling, color patterns).

In some embodiments, a sensor may advantageously detect, by way of example and not limitation, discriminate if a jam state exists on a substantially flat surface based at least partially on intensity measurements. Such embodiments may, for example, advantageously enable accurate non-contact detection of a jam state on flat sheets (e.g., paper, tissue, fabric).

In some embodiments, a sensor operating in a backgrounding mode may advantageously determine an unjammed state when a predetermined stationary background is detected. The predetermined stationary background may, for example, be detected according to a predetermined intensity threshold.

In some embodiments a sensor operating in a backgroundless mode may advantageously determine an unjammed state when no object is detected in a predetermined detection zone. The predetermined detection zone may be detected according to a predetermined intensity threshold. In various embodiments, the intensity threshold may be predetermined during a teaching operation.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary use case of scanners implemented in backgrounding and backgroundless modes deployed to detect motion of a conveyor is briefly introduced with reference to FIG. 1. With reference to FIG. 2, an exemplary jam detection engine system suitable for operating in either mode is introduced. Next, with reference to FIGS. 2-3, exemplary implementations of jam detection engines operating in a backgrounding mode and a backgroundless mode, respectively, is introduced. The discussion then continues to an exemplary embodiment of j am detection units with reference to FIG. 4. Turning to FIGS. 5A-6B, exemplary processes of motion detection are discussed. Finally, additional exemplary features and details are discussed.

In some embodiments, an electromagnetic imaging source, such as a sensor device having at least one photoelectric receiving element or pixel, scans target objects moving on a conveyor belt and creates a detection signal. The detection signal may be processed by a monitor system which may generate therefrom one or more intensity and/or distance values of the pixel. The generated intensity and/or distance values may be evaluated across a plurality of points in time against one or more thresholds to determine whether the target objects are moving on the conveyor belt or the target objects are jammed.

In various embodiments, the sensor may include, by way of example and not limitation, a laser, and an optical receiver (e.g., single pixel receiver, and/or a linear imager). The signal strength generated by the light received by the optical receiver (e.g., a reflected laser beam) may be determined. The sensor may then process the difference between the signal strengths over time to determine whether an object is moving continuously on a conveyor belt. In some embodiments, a distance may be measured through the laser by optical triangulation which determines object position by measuring light reflected from the target object. The sensor may then process the difference between the signal strengths (e.g., intensity) and/or distances over time to determine whether an object is moving continuously on a conveyor belt.

Figure 1:
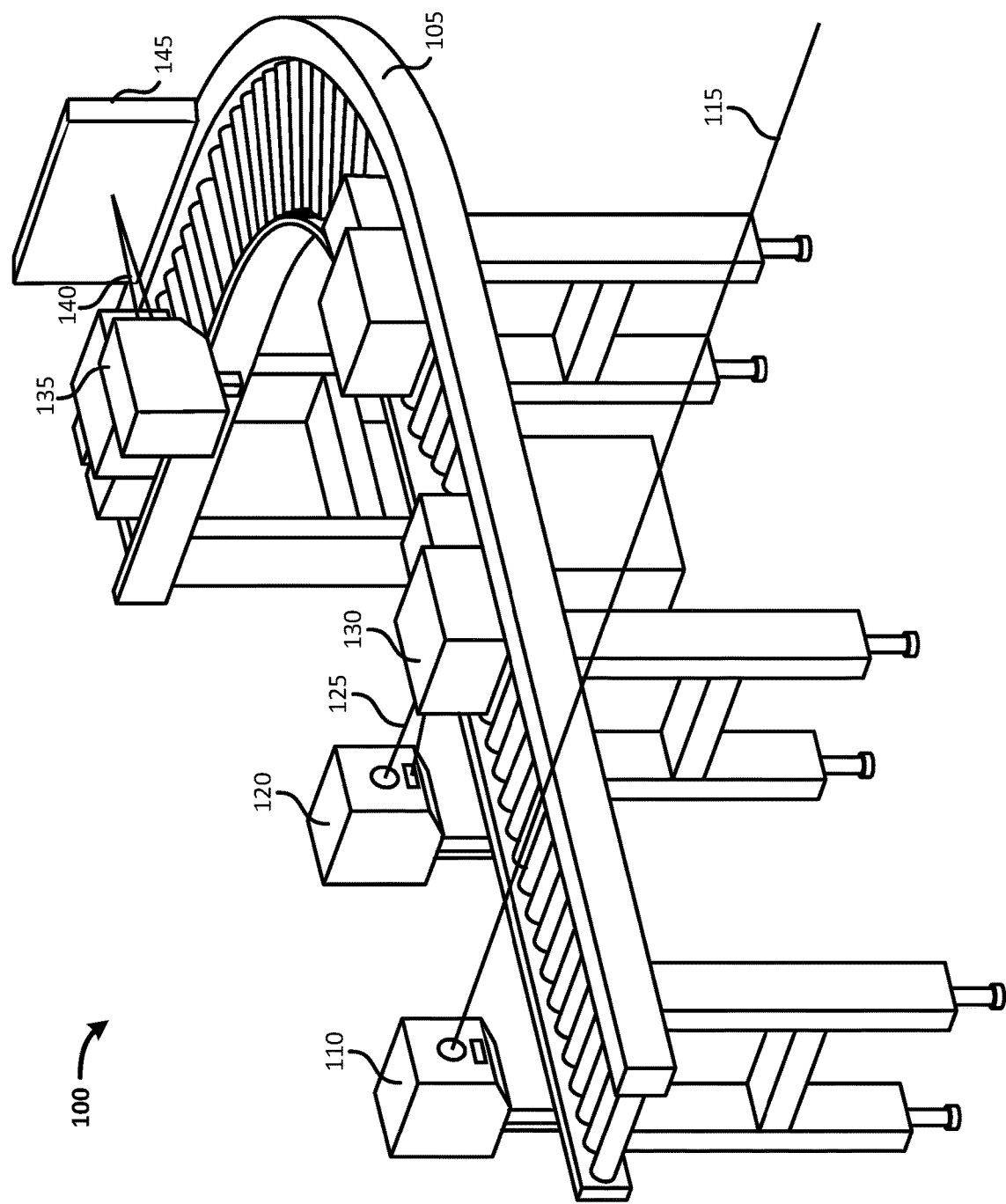
FIG. 1 depicts a perspective view of an exemplary implementation of a system for motion detection implementing jam detection units operating in both a backgrounding mode and a backgroundless mode in an illustrative use case.
Figure 2:
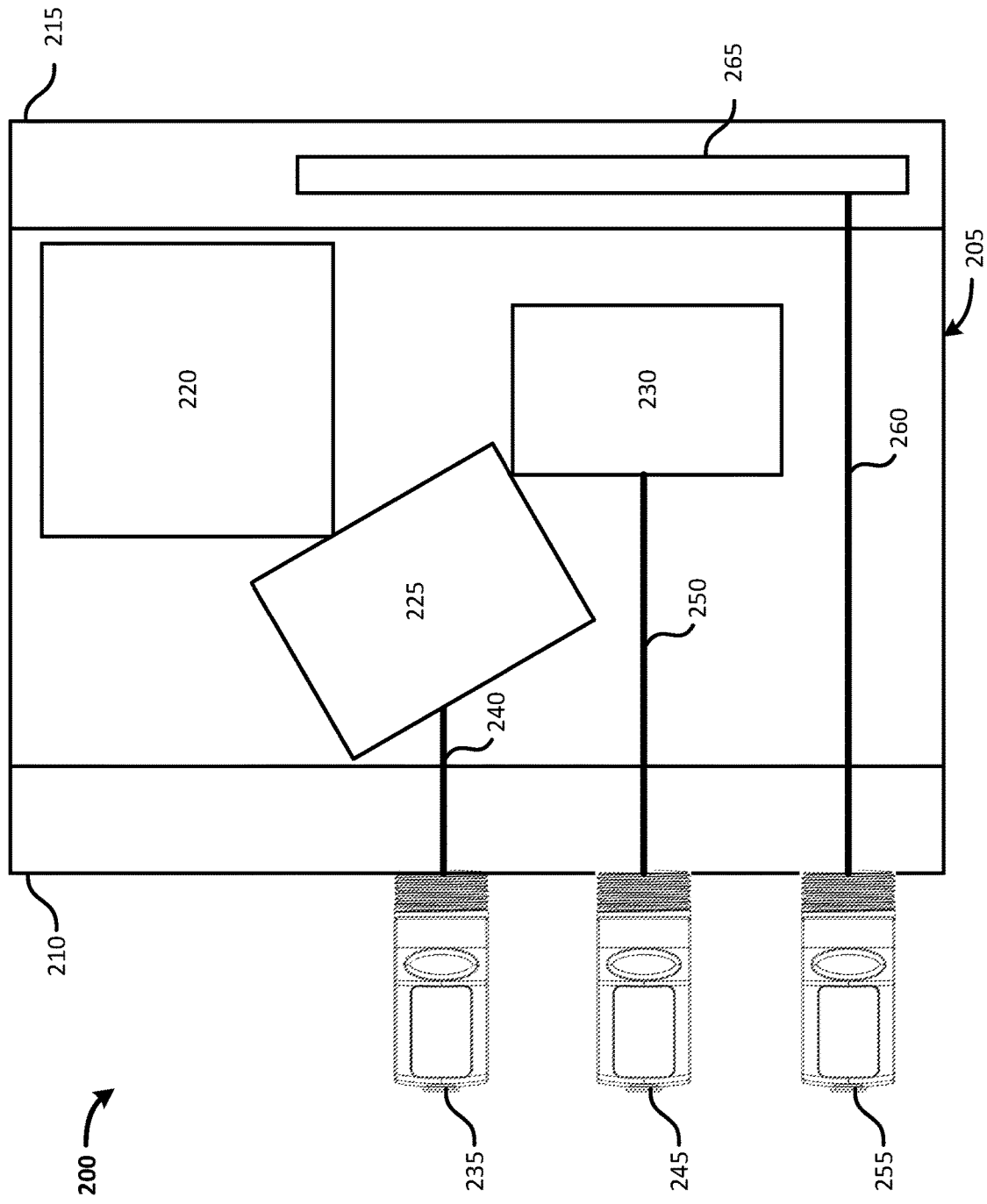
FIG. 2 depicts a top view of an exemplary implementation of a system for motion detection implementing a backgrounding mode in an illustrative use case.

FIG. 1 depicts a perspective view of an exemplary implementation of a system for motion detection implementing jam detection units operating in both a backgrounding mode and a backgroundless mode in an illustrative use case. A conveyor system 100 includes a conveyor 105 provided with two jam detection units (JDUs) 110 and 120 operating in a backgroundless mode, and a JDU operating in a backgrounding mode. The JDUs 110, 120, and 135 may be configured, for example, to detect movement of objects such as target object 130 relative to the conveyor 105. Accordingly, various embodiments may, for example, advantageously detect motion and/or lack of motion (e.g., a jam) of target objects on a conveyor line.

The JDUs 110, 120, and 135 may, for example, include both an electromagnetic signal source and an electromagnetic signal receiving element. The JDUs 110, 120, and 135 may, for example, be configured to launch signal 115, signal 125, and signal 140 and detect a returning reflection thereof, if any. In the depicted example, the JDUs 110 and 120 are configured to operate in a backgroundless mode. By way of example and not limitation, the JDU 110 launches electromagnetic signal 115 (e.g., laser beam). No target object obstructs the beam's path, and so the signal 115 may not be the reflected back to the JDU 110. Accordingly, the JDU 110 may be configured to determine that the signal traveled 'infinitely' and no jam exists. In a further illustration, an object outside of the field of view in FIG. 1, for example, may obstruct the path of the signal 115, causing a reflected signal to return to JDU 110 from an extraneous object and not from a target object. Accordingly, the JDU 110 may be configured, for example, to determine that the detected reflection correlates to an object outside of a target zone (e.g., as determined by an intensity threshold and/or a distance threshold) and so determines that no jam state exists.

The JDU 120 detects a reflection of signal 125 off target object 130 and determine therefrom that a target object is on the conveyor. The JDU 120 may be configured to compare the received reflection at a plurality of points in time and determine therefrom whether the target object 130 is moving and, thus, whether a jam state exists. Accordingly, various embodiments configured to operate in a backgroundless mode may, for example, advantageously detect the presence and/or absence of a jam condition, for example, based on applying an intensity and/or distance threshold(s) to determine if a detected signal reflection(s) corresponds to a predetermined detection region.

The JDU 135 operating in a backgrounding mode launches electromagnetic signal 140, which reflects off of stationary background 145. The reflection is received again by the JDU 135. The JDU 135 may be configured, for example, with a predetermined threshold corresponding to an intensity and/or distance associated with receiving a reflection of signal 140 off background 145. Accordingly, the JDU 135 may be configured to determine therefrom that the signal 140 is reflecting off of stationary background 145 and, therefore, that no target object is positioned in front of JDU 135 and so no jam state exists. Accordingly, various embodiments configured to operate in a backgrounding mode may, for example, advantageously detect the presence and/or absence of a jam condition, for example, based on applying an intensity and/or distance threshold(s) to determine if a detected signal reflection(s) corresponds to a predetermined stationary background.

In various embodiments, by the JDU using intensity, the JDU may advantageously provide greater robustness in discrimination between a desired motion and a jam state, for example. The JDU may, for example, advantageously be able to discriminate in motion not only based on distance (e.g., changes in distance between a reflecting object and a receiving element of the JDU), but based on motion-related changes in intensity of a reflected signal. For example, a substantially flat moving surface (e.g., a sheet of material) may not substantially change in distance from the JDU. However, the JDU may be able to detect motion and discern that a jam state does not exist based on changes in intensity (e.g., based on labels, color patterns, grayscale patterns, changes in reflectivity).

As an illustrative example, a large package (e.g., a long box) may pass a JDU monitoring a conveyor. A detected surface of the package may, for example, not substantially change in distance from the JDU. However, the package may have printing and/or patterns on the package. The JDU may, for example, determine that the package is moving based on intensity changes over time even though no significant change in distance to the reflecting object over time is detected within a 'watchdog timer' (e.g., elapsed time threshold).

FIG. 2 depicts a top view of an exemplary implementation of a system for motion detection implementing a backgrounding mode in an illustrative use case. Conveyor system 200 includes a conveyor belt 205 bounded on the left of belt 205 by stationary boundary wall 210 and on the right by stationary boundary wall 215. Target objects 220, 225, and 230 are disposed on the belt 205. Exemplary JDUs 235, 245, and 255 launch electromagnetic signals 240, 250, and 260, respectively which may be, by way of example and not limitation, optical beams. The signal 240 strikes the target object 225 and reflects back to the JDU 235. The signal 250 strikes the target object 230 and reflects back to the JDU 245. The signal 260 strikes stationary background 265 and reflects back to the JDU 255. The JDUs 235, 245, and 255 may be configured, for example, to determine intensity of a reflected signal and/or determine from a reflected signal the distance to an object causing the associated beam to be reflected.

If the target objects 220, 225, and 230 are moving upward (relative to FIG. 2) at a desired speed on conveyor belt 205, for example, and so a jam condition does not exist, over a period of time each of the JDUs 235, 245, and 255 will detect a reflection of the corresponding signal 240, 250, and 260, respectively, off of background 265, target object 230, target object 225, and target object 220, followed by stationary background 265 again. The JDUs may be configured, for example, to determine an intensity and/or distance value associated with the received reflection. The intensity and/or distance value may be compared, for example, to a predetermined intensity and/or distance threshold(s) correlating to a reflection of a signal off of stationary background 265. Accordingly, the JDUs 235, 245, and 255 may determine if the belt 205 is clear of target objects, at least at the monitored location. The predetermined threshold(s) may, for example, be set in a teaching mode (e.g., by entering a teach mode, allowing a signal to reflect off a known stationary background and determining a threshold therefrom), be set by manually inputting a threshold value(s) (e.g., by inputting a known distance and/or intensity value), or some combination thereof.

Figure 3:
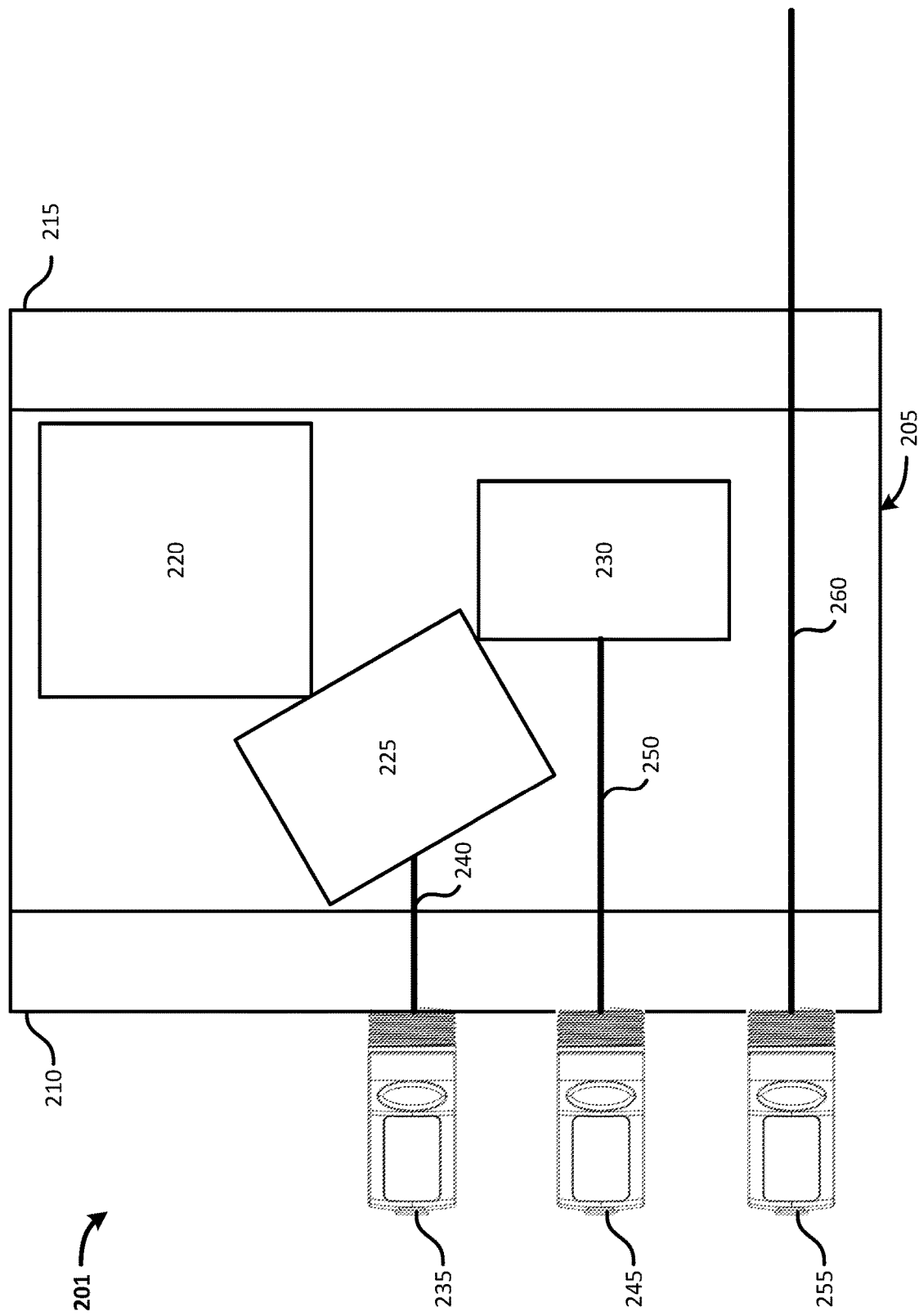
FIG. 3 depicts a top view of an exemplary implementation of a system for motion detection implementing a backgroundless mode in an illustrative use case.

FIG. 3 depicts a top view of an exemplary implementation of a system for motion detection implementing a backgroundless mode in an illustrative use case. Conveyor system 201 includes a conveyor belt 205 bounded on the left of belt 205 by stationary boundary wall 210 and on the right by stationary boundary wall 215. Target objects 220, 225, and 230 are disposed on the belt 205. Exemplary JDUs 235, 245, and 255 launch electromagnetic signals 240, 250, and 260, respectively which may be, by way of example and not limitation, optical beams. The signal 240 strikes the target object 225 and reflects back to the JDU 235. The signal 250 strikes the target object 230 and reflects back to the JDU 245. The signal 260 proceeds on indefinitely, or reflects back to the JDU 255 from a non-target object not in the view of FIG. 3. The JDUs 235, 245, and 255 may be configured, for example, to determine intensity of a reflected signal and/or determine from a reflected signal the distance to an object causing the associated beam to be reflected.

If the target objects 220, 225, and 230 are moving upward (relative to FIG. 3) at a desired speed on conveyor belt 205, for example, and so a jam condition does not exist, over a period of time each of the JDUs 235, 245, and 255 will detect no reflection (or a reflection off a distant object) of the corresponding signal 240, 250, and 260, respectively, followed by a reflection off target object 230, then target object 225, then target object 220, followed again by no reflection or a reflection off a distant object. The JDUs may be configured, for example, to determine an intensity and/or distance value associated with the received reflection. The intensity and/or distance value may be compared, for example, to a predetermined intensity and/or distance threshold(s) correlating to a reflection of a signal off of an object between one of the JDUs and wall 215. Accordingly, the JDUs 235, 245, and 255 may determine if any target object(s) is present within a detection window corresponding to belt 205, at least at the monitored location. The predetermined threshold(s) may, for example, be set in a teaching mode (e.g., by entering a teach mode, allowing a signal to reflect off an object positioned at wall 215 and determining a threshold therefrom), be set by manually inputting a threshold value(s) (e.g., by inputting a known distance and/or intensity value corresponding to wall 215), or some combination thereof.

Figure 4:
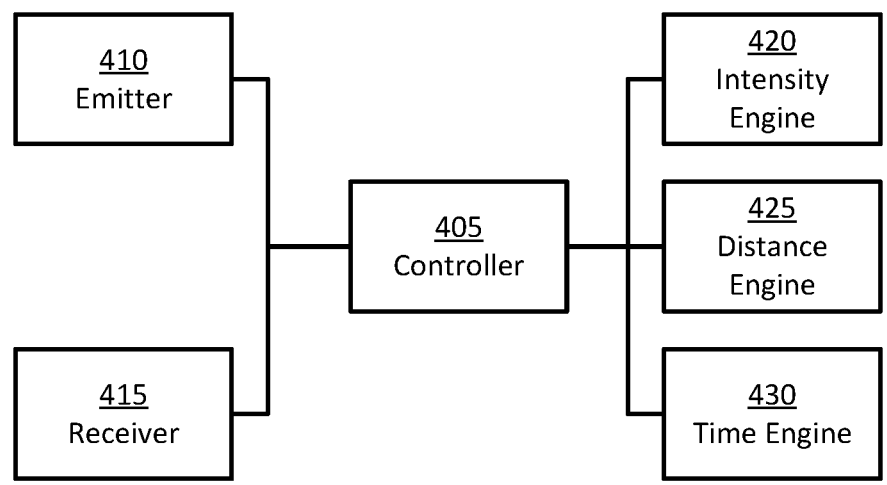
FIG. 4 depicts a top-level block diagram of an exemplary jam detection circuit.

FIG. 4 depicts a top-level block diagram of an exemplary jam detection circuit. A jam detection circuit 400 includes a controller 405. The controller may, for example, include a microprocessor operably connected to at least one datastore provided with a program of instructions and configured to execute the instructions to cause motion monitoring operations to be performed. The controller 405 is operably coupled to and configured to control an emitter 410 and a receiver 415. The emitter 410 may be operated to launch electromagnetic signals such as, for example, optical beams. The emitter 410 may, by way of example and not limitation, be an optical transmitter (e.g., laser), an ultrasonic transmitter, or some combination thereof. The receiver 415 may be operated to detect reflected electromagnetic signals, such as of the type emitted by emitter 410. The receiver 415 may, by way of example and not limitation, be an optical receiver (e.g., a photoelectric element), an ultrasonic receiver, or some combination thereof.

The controller 405 is operably coupled to and configured to cause operations to be performed by intensity engine 420, distance engine 425, and time engine 430. Intensity engine 420 may be operably coupled to controller 405 and configured to determine an intensity of a reflected signal received by receiver 415. Intensity engine 420 may, for example, compare an intensity against a predetermined intensity threshold(s). An intensity threshold may, for example, correspond to a predetermined detection window or predetermined stationary background. Distance engine 425 may be operably coupled to controller 405 and configured to determine a distance from a reflected signal received by receiver 415. Distance engine 425 may, for example, compare a distance against a predetermined distance threshold(s). A distance threshold may, for example, correspond to a predetermined detection window or predetermined stationary background. Distance engine 425 may be omitted in some embodiments. Intensity engine 420 may be omitted in some embodiments.

Time engine 430 may be operably coupled to controller 405 and configured to monitor and determine an elapsed time since a predetermined characteristic of a reflected signal received by receiver 415. The time engine 430 may be configured to determine a time elapsed since a trigger has been activated such as, by way of example and not limitation, a potential jam detection trigger activated because an attribute(s) (e.g., intensity and/or distance) of a reflected signal received is greater than or less than a predetermined threshold(s). Similarly, for example, a window between a maximum and a minimum of an attribute may be compared to a predetermined threshold and a trigger activated and monitored by time engine 430. Accordingly, various embodiments may, for example, advantageously detect the existence of a jam condition by evaluating one or more attributes of reflected signal(s) against one or more predetermined thresholds across a plurality of points in time.

Figure 5A:
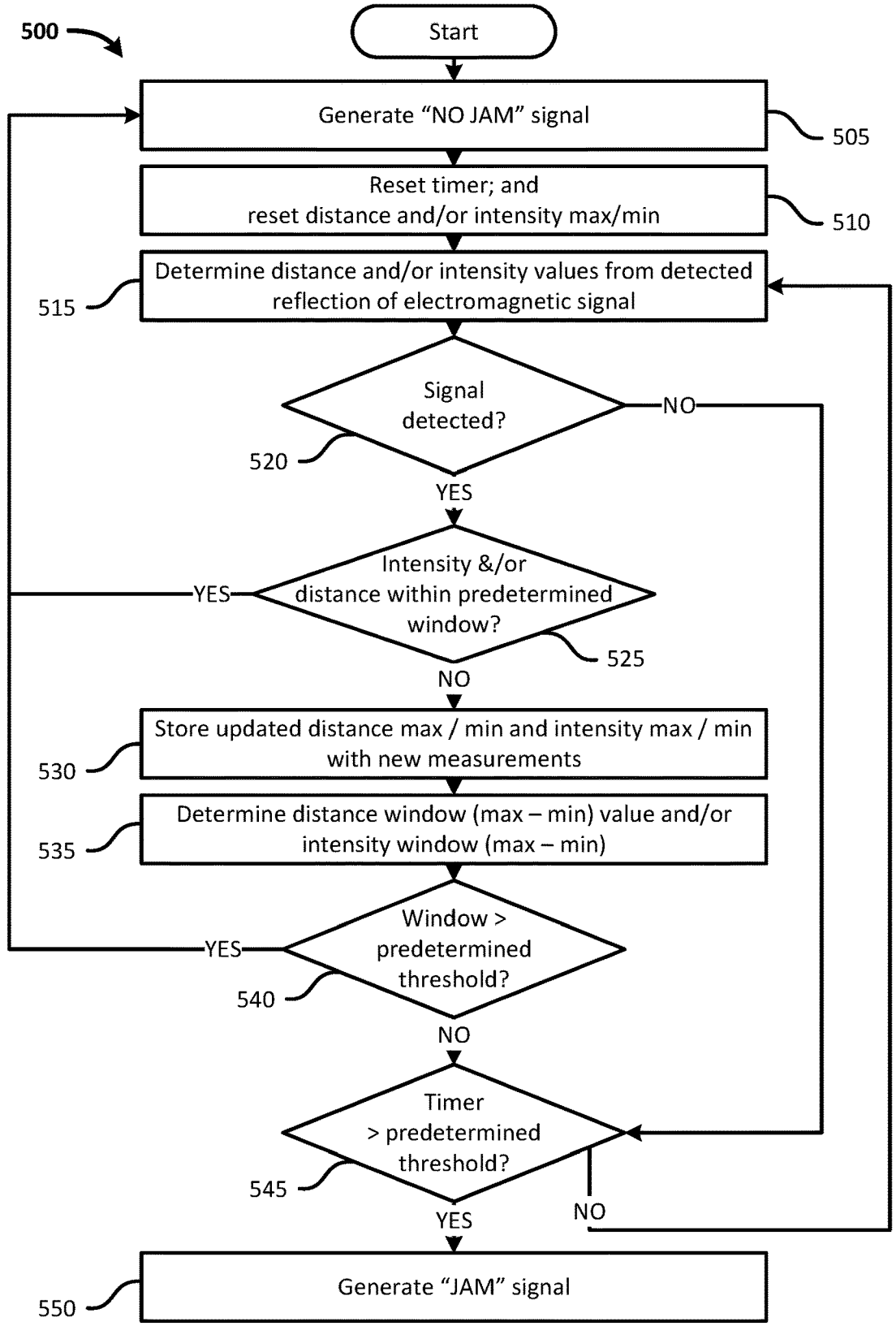
FIG. 5A depicts a flowchart detailing an exemplary process of motion detection implementing a backgrounding mode.

FIG. 5A depicts a flowchart detailing an exemplary process of motion detection implementing a backgrounding mode. Method 500 begins by generating 505 a "NO JAM" signal indicative of a not jammed condition. Variables are reset 510 to default values, including a timer which may be set to zero, and a maximum and minimum intensity and/or maximum and minimum distance which may be set to zero and infinity, respectively. A received reflection of an electromagnetic signal may be evaluated to determine 515 an intensity and/or a distance corresponding thereto. If a signal corresponding to a received reflection is detected 520, the distance and/or intensity value(s) determined in step 515 are compared 525 against a corresponding predetermined distance and/or intensity threshold (e.g., a predetermined window corresponding to a background such as stationary background 145 in FIG. 1 and/or stationary background 265 in FIG. 2). By way of example and not limitation, an intensity greater than a predetermined intensity threshold (e.g., an intensity which is greater than an intensity window associated with a taught stationary background) may be associated with detection of a target object between a JDU and a predetermined stationary background.

If the calculated intensity value(s) and/or the calculated distance value(s) are not within the predetermined window(s) (e.g., intensity greater than or equal to a predetermined intensity threshold(s) associated with the stationary background, and/or a distance less than or equal to a predetermined distance threshold(s) associated with the stationary background, respectively), the current measurements are compared to stored max/min distance and/or intensity values and the running max/min values are updated 530 accordingly. A current intensity window and/or distance window is determined 535 by comparing the respective maximum and minimum value updated in step 530. The window(s) determined in step 535 are compared 540 to a corresponding predetermined intensity and/or distance window threshold(s). A window less than a predetermined window threshold may, by way of example and not limitation, correspond to the passage of a target object across a detection window of the JDU. For example, the window threshold may correspond to a difference in distance between a specific target object at its closest to the JDU and a gap between the specific target object and a following target object. Accordingly, various embodiments may, for example, identify a potential jam state when a predetermined window threshold is not exceeded.

If the window is not greater than the corresponding predetermined threshold, then a current elapsed time of the timer is compared 545 to a predetermined time elapsed threshold. If the elapsed time exceeds the threshold, a "JAM" signal is generated 550 indicating a jammed condition, for example, of a conveyor belt. By way of example and not limitation, a predetermined elapsed time threshold may correspond to a time necessary for a target object to move past the JDU. Accordingly, various embodiments may, for example, advantageously implement a 'watchdog timer' such that a potential jam state must be detected for a predetermined amount of elapsed time before a "JAM" signal is generated.

If a signal is not detected at step 520, the process immediately proceeds to compare 545 the current elapsed time against the predetermined elapsed time threshold. By way of example and not limitation, a lack of signal at step 520 may indicate that an object may be directly adjacent a face of the JDU such that, for example, an emitted signal is being reflected directly back into the emitter (e.g., a box surface pressed directly against an emitter surface and completely occluding the emitter) such that the receiver does not receive a reflected image. Accordingly, if no signal is detected, the process may, for example, treat it as a tentative jam condition and check elapsed time without resetting the time counter at least until a signal is detected again.

If the intensity value at step 525 and/or the distance value is within the predetermined window (e.g., the intensity is less than a predetermined intensity threshold associated with the stationary background and/or the distance is greater than the predetermined distance threshold, respectively), the process returns to step 505 to generate a "NO JAM" signal and subsequently reset 510 the timer and max/min values. By way of example and not limitation, an intensity less than the predetermined intensity threshold and/or a distance value is greater than the predetermined distance threshold may indicate that a target object is detected between the predetermined stationary background and the JDU. Accordingly, the JDU may be advantageously configured to immediately detect an unjammed state based on a predetermined intensity and/or distance threshold associated with a known stationary background.

If the determined intensity and/or distance window at step 540 is determined to be greater than the predetermined window threshold(s), the process likewise returns to step 505. By way of example and not limitation, an intensity and/or distance window greater than a predetermined window threshold may be associated with a predetermined difference in distance to an object reflecting a launched electromagnetic signal between two measurements. Accordingly, various embodiments may, for example, be configured to advantageously detect unjammed motion by detecting a difference in distance and/or intensity between at least two points in time.

If the current elapsed time is not greater than the predetermined elapsed time threshold (step 545), the process returns to step 515. The timer and distance and/or intensity max/min values are not reset, and current intensity and/or distance values are determined 515. By way of example and not limitation, an elapsed time not greater than the predetermined elapsed time threshold may be associated with a potential jam state that should not yet be determined as a jam condition. For example, a long box may be passing, triggering detection of a potential jam state. The predetermined time threshold may, for example, correspond to a maximum length of a box at a predetermined motion speed. Accordingly, various embodiments may, for example, advantageously reject false jam alarms using a predetermined time elapsed threshold.

Figure 5B:
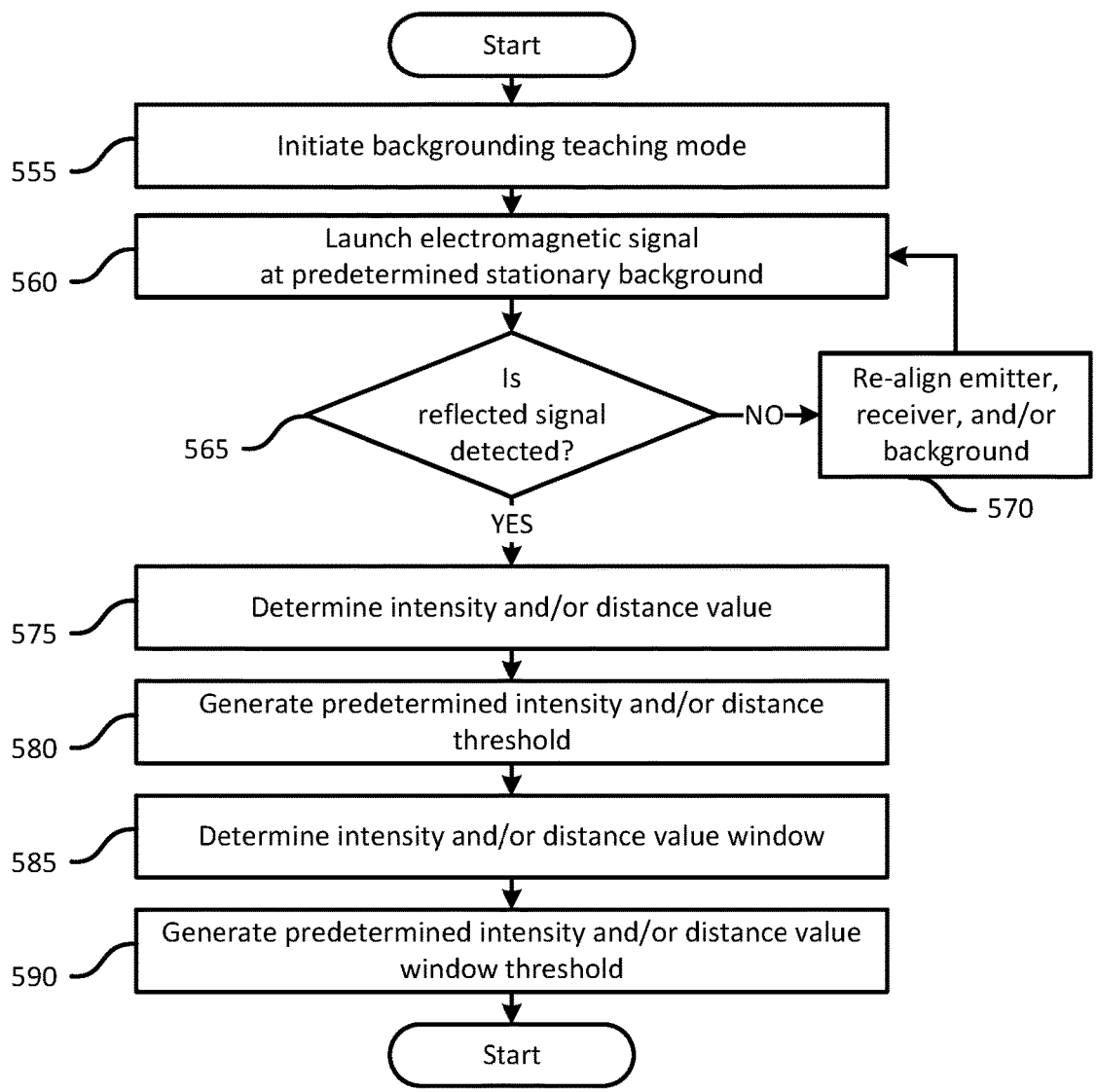
FIG. 5B depicts a flowchart detailing an exemplary backgrounding mode teaching process.

FIG. 5B depicts a flowchart detailing an exemplary backgrounding mode teaching process. In an exemplary method 501, the teaching process begins when a backgrounding teaching mode is initiated 555. The teaching process may, for example, be initiated by a user (e.g., by pressing a button on a JDU, by initiating from a control console). In an exemplary use case, for example, a JDU may be positioned on one side of a conveyor belt, and a stationary background may be disposed on an opposite side of the conveyor belt. The stationary background may, by way of example and not limitation, be an existing structure (e.g., a wall), a specially installed structure (e.g., an installed reflective barrier), other appropriate background capable of reflecting an emitted electromagnetic signal, or some combination thereof. The JDU is then operated to launch 560 an electromagnetic signal towards the predetermined stationary background, and the process determines if a reflection of the emitted electromagnetic signal is detected 565. If the reflected signal is not detected, the emitter, receiver, and/or background are re-aligned 570, and the process repeated.

If a reflected signal is detected 565, a value(s) of intensity and/or distance of the reflected signal is determined 575. The value(s) may, for example, be associated with the JDU detecting a predetermined stationary background. The value(s) determined in step 575 are set 580 as a predetermined intensity and/or distance threshold(s). Accordingly, a JDU may determine if a predetermined stationary background is detected and, accordingly, may quickly determine therefrom whether a potential jam state may not exist. For example, when the predetermined stationary background is detected, the JDU may immediately determine that a jam state does not exist.

Subsequently an intensity and/or distance value window is determined 585. By way of example and not limitation, the window may be set manually by entering predetermined values. The window may, for example, be set in an assisted teaching operation wherein the JDU detects a maximum range and a minimum range and, therefore, determine an appropriate window therefrom. In various embodiments the window may, by way of example and not limitation, correspond to a location of a background object (e.g., as described with reference to 145, 265 of FIGS. 1-2).

In the depicted example, a predetermined intensity and/or distance value window threshold is then generated 590. The window threshold may correspond, for example, to the threshold applied in step 540 of method 500 described with reference to FIG. 5A. The window threshold may, for example, be selected from a default value(s), be taught during an assisted teaching operation, be manually input by a customer, or some combination thereof. The window threshold may, for example, provide a threshold for detection of motion even when a reference background is not 'visible.'

In various embodiments the window threshold may, by way of example and not limitation, correspond to the radius of a bottle (e.g., a row of bottles), a maximum width of a box, or other appropriate window. Accordingly, various such embodiments may, for example, be configured to advantageously distinguish between individual target objects on a conveyor. In various embodiments, the teaching operation may further include teaching an elapsed time threshold. An elapsed time threshold may, by way of example and not limitation, be taught by a stopwatch mechanism configured to determine (e.g., by a user indicating a start time and a stop time) an elapsed time for a target object to move by the JDU.

Figure 6A:
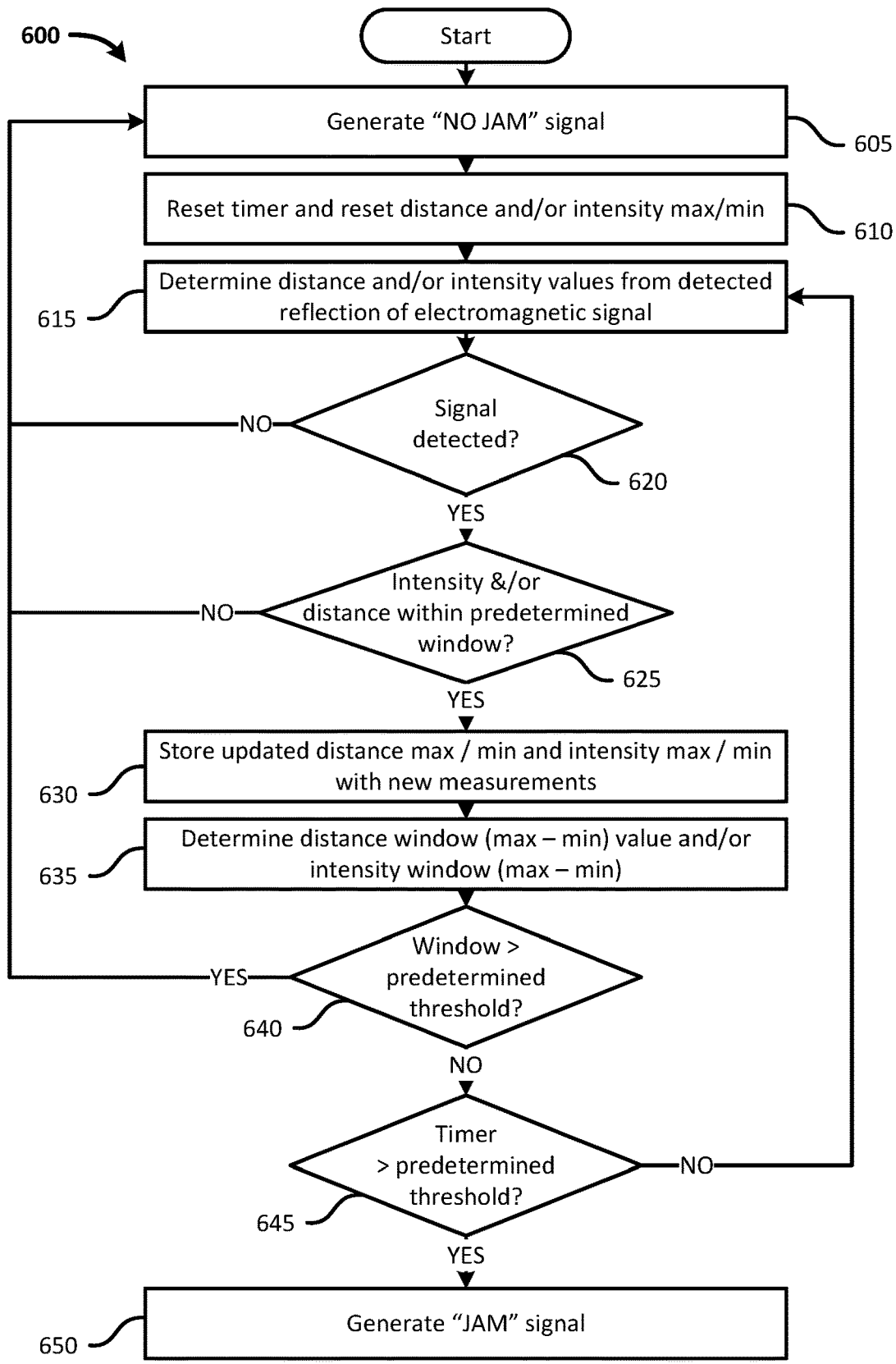
FIG. 6A depicts a flowchart detailing an exemplary process of motion detection implementing a backgroundless mode.

FIG. 6A depicts a flowchart detailing an exemplary process of motion detection implementing a backgroundless mode. Method 600 begins by generating 605 a "NO JAM" signal indicative of a not jammed condition. Variables are reset 610 to default values, including a timer which may be set to zero, and a maximum and minimum intensity and/or maximum and minimum distance which may be set to zero and infinity, respectively. A received reflection of an electromagnetic signal may be evaluated to determine 615 an intensity and/or a distance corresponding thereto. If a signal corresponding to a received reflection is detected 620, the distance and/or intensity value(s) determined in step 615 are compared 625 against a corresponding predetermined distance and/or intensity threshold (e.g., intensity and/or distance window, as depicted, corresponding to a region of interest). By way of example and not limitation, an intensity greater than or equal to a predetermined intensity threshold (e.g., associated with detection of a target object within a predetermined detection zone from the JDU) and/or a distance less than or equal to a predetermined distance threshold (e.g., associated with a target object within a predetermined distance from the JDU) may be associated with detection of a target object between a JDU and a predetermined distance from the JDU.

If the calculated intensity value(s) and/or the calculated distance value(s) are within the predetermined window (e.g., intensity greater than or equal to a predetermined threshold(s) corresponding to a maximum distance from the sensor of a predetermined detection zone and/or a distance less than or equal to a predetermined threshold(s) corresponding to a maximum extent of a predetermined detection zone), the current measurements are compared to stored max/min distance and/or intensity values and the running max/min values are updated 630 accordingly. A current intensity window and/or distance window is determined 635 by comparing the respective maximum and minimum value updated in step 630. The window(s) determined in step 635 are compared 640 to a corresponding predetermined intensity and/or distance window threshold(s). A window less than a predetermined window threshold may, by way of example and not limitation, correspond to the passage of a target object across a detection window of the JDU. For example, the window threshold may correspond to a difference in distance between a specific target object at its closest to the JDU and a gap between the specific target object and a following target object. Accordingly, various embodiments may, for example, identify a potential jam state when a predetermined window threshold is not exceeded.

If the window is not greater than the corresponding predetermined threshold, then a current elapsed time of the timer is compared 645 to a predetermined time elapsed threshold. If the elapsed time exceeds the threshold, a "JAM" signal is generated 650 indicating a jammed condition, for example, of a conveyor belt. By way of example and not limitation, a predetermined elapsed time threshold may correspond to a time necessary for a target object to move past the JDU. Accordingly, various embodiments may, for example, advantageously implement a 'watchdog timer' such that a potential jam state must be detected for a predetermined amount of elapsed time before a "JAM" signal is generated.

If a signal is not detected at step 620, the process immediately proceeds to step 605 to output a "NO JAM" signal. By way of example and not limitation, a lack of signal at step 620 may indicate that no object is in front of the JDU such that, for example, an emitted signal is traveling indefinitely without being reflected (e.g., across a warehouse) such that the receiver does not receive a reflected image. Accordingly, if no signal is detected, the process accordingly treats it as an unjammed condition.

If the intensity value at step 625 and/or the distance value is not within the predetermined window (e.g., intensity less than the predetermined intensity threshold and/or distance greater than the predetermined distance threshold), the process returns to step 605 to generate a "NO JAM" signal and subsequently reset 610 the timer and max/min values. By way of example and not limitation, an intensity and/or a distance value within the predetermined window (e.g., greater than the predetermined intensity threshold and/or less than the predetermined distance threshold, respectively) may indicate that a target object is detected within a predetermined detection zone from the JDU. Accordingly, the JDU may be advantageously configured to immediately detect an unjammed state based on a predetermined intensity and/or distance window (e.g., at least one threshold) associated with being outside of a predetermined detection window (e.g., a width of a conveyor belt).

If the determined intensity and/or distance window at step 640 is determined to be greater than the predetermined window threshold(s), the process likewise returns to step 605. By way of example and not limitation, an intensity and/or distance window greater than a predetermined window threshold may be associated with a predetermined difference in distance to an object reflecting a launched electromagnetic signal between two measurements. Accordingly, various embodiments may, for example, be configured to advantageously detect unjammed motion by detecting a difference in distance and/or intensity between at least two points in time.

If the current elapsed time is not greater than the predetermined elapsed time threshold (step 645), the process returns to step 615. The timer and distance and/or intensity max/min values are not reset, and current intensity and/or distance values are determined 615. By way of example and not limitation, an elapsed time not greater than the predetermined elapsed time threshold may be associated with a potential jam state that should not yet be determined as a jam condition. For example, a long box may be passing, triggering detection of a potential jam state. The predetermined time threshold may, for example, correspond to a maximum length of a box at a predetermined motion speed. Accordingly, various embodiments may, for example, advantageously reject false jam alarms using a predetermined time elapsed threshold.

Figure 6B:
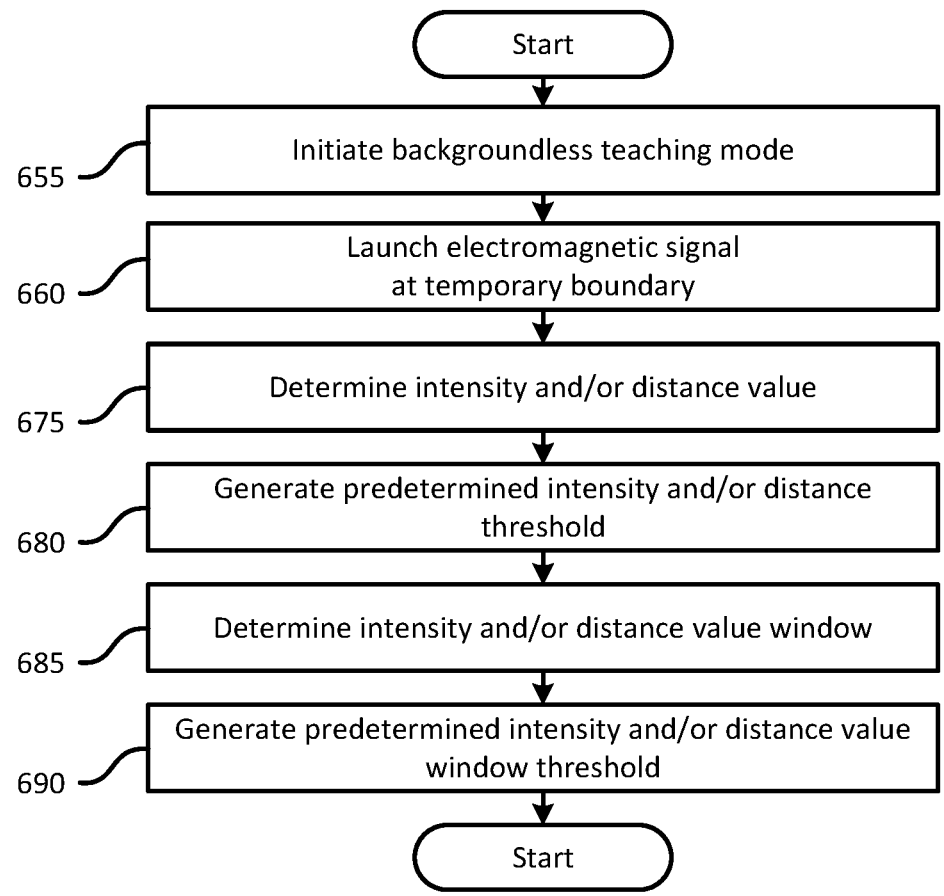
FIG. 6B depicts a flowchart detailing an exemplary backgroundless mode teaching process.

FIG. 6B depicts a flowchart detailing an exemplary backgroundless mode teaching process. In an exemplary method 601, the teaching process begins when a backgroundless teaching mode is initiated 655. The teaching process may, for example, be initiated by a user (e.g., by pressing a button on a JDU, by initiating from a control console). In an exemplary use case, for example, a JDU may be positioned on one side of a conveyor belt, and oriented to emit a beam across the belt and substantially parallel to a conveying surface thereof. The JDU may, by way of example and not limitation, in the absence of a target object on the conveyor belt, receive no reflected signal and/or receive a reflection caused by an emitted signal reflecting off an object not on the conveyor belt (e.g., a distant object, wall, person, vehicle). A temporary boundary may be positioned to define a predetermined detection zone (e.g., at an opposite side of the conveyor belt from the JDU). The JDU is then operated to launch 660 an electromagnetic signal towards the temporary boundary. In some embodiments (a user and/or further steps in a circuit-implemented process may determine, for example, if a reflection of the emitted electromagnetic signal is detected. If the reflected signal is not detected, the emitter, receiver, and/or boundary may be re-aligned, and the process repeated.

A value(s) of intensity and/or distance of a reflection of the electromagnetic signal is determined 675. The value(s) may, for example, be associated with the JDU detecting an object within a predetermined detection zone. The value(s) determined in step 675 are set 680 as a predetermined intensity and/or distance threshold(s). Accordingly, a JDU may determine if a target object is detected within a predetermined detection zone and, accordingly, may quickly determine therefrom whether a potential jam state may not exist and/or whether a signal from a detected reflection should be rejected as being caused by an object outside of the predetermined detection zone. For example, when no reflection is detected, or a reflection is detected originating from outside the predetermined detection zone, the JDU may immediately determine that a jam state does not exist.

Subsequently an intensity and/or distance value window is determined 685 such as, for example, as discussed in relation to step 585 of FIG. 5B. In the depicted example, an intensity and/or distance value window threshold is generated 690 (e.g., as described with reference to step 590 of FIG. 5B). The window threshold may, for example, correspond to the predetermined threshold of step 640 described with reference to FIG. 6A. In various embodiments the window threshold may, for example, be selected from a default value(s), be taught during an assisted teaching operation, be manually input by a customer, or some combination thereof. The window threshold may, for example, provide a threshold for detection of motion even when an object is detected (e.g., a reflected electromagnetic signal is received). In various embodiments, an elapsed time threshold may, for example, be determined as discussed in relation to FIG. 5B.

Although various embodiments have been described with reference to the figures, other embodiments are possible. For example, although an exemplary system has been described with reference to the figures other implementations may be deployed in other industrial, scientific, medical, commercial, and/or residential applications.

For example, although the distance and/or intensity windows have been described in the context of maximum to minimum windows (e.g., 'ranges'), such as with respect to 535 of FIG. 5A and 635 of FIG. 6A, other windows may be generated. As an illustrative example, a window may be generated based on a standard deviation and/or other statistical analysis. In some embodiments, for example, a first-in first-out buffer may store an N number of samples. A (predetermined) analysis may be performed on M (where M≤N) of the N samples. The N samples may, for example, include the current intensity and/or distance sample. The predetermined analysis may include a statistical analysis. A window may be generated based on a predetermined multiplier of a standard deviation of the M samples.

For example, although various predetermined thresholds have been described as being a setting that is user-defined, a user may establish a threshold setting in a learn mode (e.g., a 'teach' mode) of the monitor system. For example, a JDU may generate a threshold setting(s) and store the threshold setting(s). Advantageous results may be achieved if the threshold setting is automatically adjusted by the JDU (e.g., by a monitoring module) after the initial setting to calibrate a threshold setting more finely. For example, the JDU may calibrate a threshold based on temperature. The JDU may calibrate a threshold, for example, based on ambient light. The JDU may, for example, update a threshold based on feedback from the user (e.g., indicating a jam state or not-jammed state, such as in agreement or disagreement with a currently outputted stated of the JDU).

In an exemplary advantageous modification, a JDU may be configured to learn criteria that identifies a motion state, establish the learned criteria as a baseline to detect motion, and/or automatically calibrate a threshold based on the learned criteria. In yet another advantageous embodiment, the JDU may be configured to enable both a user-defined threshold and a machine learned threshold.

Although various embodiments have been discussed herein in relation to integrated JDUs, other configurations are possible. For example, various jam detection system may include a desired combination of separate and/or integrated sensors, emitters, and controllers. Although various embodiments have been discussed herein in relation to single JDUs, chained or otherwise associated JDUs may be used. By way of example and not limitation, one or more thresholds (e.g., intensity, distance, and/or time) may be configured to be applied to a combination of signals for one or more JDUs. For example, a controller may be configured to determine whether a "JAM" signal is generated based at least partially off of a comparison of signals from a plurality of JDUs. By way of example and not limitation, an unjammed state may be detected by comparing reflections received by two spatially separated JDUs. Accordingly, various embodiments may, for example, advantageously reduce false jam alarms, and/or more quickly identify a jam condition.

In some embodiments, various circuits and/or computer system environments (e.g., jam detection circuit 400) may include fewer or more components (e.g., than discussed in relation to FIG. 4) to perform a method(s) described. For example, the computing system and devices may include various combinations of hardware and/or software that can perform indicated functions. Such components may, by way of example and not limitation, include computers, application specific integrated circuits (ASICs), field programmable gate arrays (FPGAs), network devices, and/or internet applications, including, for example and without limitation, web-based applications. A computer system environment may, for example, be connected to other devices that are not illustrated. A computer system environment may, for example, operate as a stand-alone system. In some embodiments, functionality provided by various illustrated components may, by way of example and not limitation, be combined with fewer components. In some embodiments, for example, functionality may be distributed in additional components. In some embodiments, for example, functionality of some of the illustrated components may not be provided and/or additional functionality may be available.

While various items are illustrated as being stored in memory or a data store, in some embodiments these items or portions of them may be transferred between memory and other storage devices, such as for purposes of memory management and data integrity. In some embodiments, some or all of the software components may execute in memory on another device and communicate with the illustrated computing system via inter-computer communication.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a monitor system for non-contact motion detection may include a processor. The monitor system may include an electromagnetic imaging source. The electromagnetic imaging source may include a receiving element configured by the processor to generate an intensity signal (e.g., 515, 615) as a function of an intensity of a reflected electromagnetic signal. The monitor system may include a data store operatively coupled to the processor and containing instructions that, when executed by the processor, cause the processor to perform operations to detect a motion state of objects. The operations may include, in response to detecting the reflected electromagnetic signal (e.g., 515, 615), compare the intensity signal to a predetermined intensity threshold (e.g., 525, 625). The operations may include, if the intensity signal is greater than or equal to the intensity threshold, then determine an intensity window metric from a comparison of the intensity threshold with at least one stored intensity value (e.g., 535, 635). The operations may include determine if the intensity window metric is greater than a predetermined intensity window threshold (e.g., 540, 640). The operations may include, if the intensity window metric is not greater than the intensity window threshold and if a time elapsed since a historic intensity window metric exceeded the intensity window threshold is greater than a predetermined time elapsed threshold (e.g., 545, 645), then, generate a signal that indicates a jam state (e.g., 550, 650).

The operations may include, if the reflected electromagnetic signal is not detected (e.g., 515) and if a time elapsed since a historic intensity window metric exceeded the intensity window threshold is greater than the time elapsed threshold (e.g., 545), then generate the signal that indicates the jam state (e.g., 550, 650).

The operations may include, if the intensity signal is within the intensity threshold (e.g., 525), then generate a signal that indicates a not jammed state (e.g., 505).

The receiving element may be further configured to generate a distance signal from the reflected electromagnetic signal. The operations may include compare the distance signal to a predetermined distance threshold (e.g., 525). The operations may include, if the distance signal is within the distance threshold (e.g., 525), then generate a signal that indicates a not jammed state (e.g., 505).

The operations may include, if the intensity signal is outside the intensity threshold (e.g., 625), then generate a signal that indicates a not jammed state (e.g., 605).

The receiving element may be configured to generate a distance signal from the reflected electromagnetic signal. The operations may include compare the distance signal to a predetermined distance threshold (e.g., 625). The operations may include, if the distance signal is outside the distance threshold (e.g., 625), then generate a signal that indicates a not jammed state (e.g., 605).

The operations may include, if the intensity window metric is outside the intensity window threshold (e.g., 540, 640), then generate a signal that indicates a not jammed state (e.g., 505, 605).

The operations may include, if the time elapsed is less than the time elapsed threshold (e.g., 545, 645), then repeat the operations.

The operations may include, if the reflected electromagnetic signal is not detected (e.g., 615, 620), then generate a signal that indicates a not jammed state (e.g., 605).

The operations may include intensity threshold predetermination operations for generating a predetermined intensity threshold. The intensity threshold predetermination operations may include provide a predetermined object such that an electromagnetic signal launched thereat generates the reflected electromagnetic signal to the receiver. The intensity threshold predetermination operations may include, in response to detecting the reflected electromagnetic signal (e.g., 565, 665), determine the intensity value of the reflected electromagnetic signal (e.g., 575, 675). The intensity threshold predetermination operations may include generate the intensity threshold from the intensity value.

The intensity threshold predetermination operations may include determine an intensity value window. The intensity threshold predetermination operations may include generate a predetermined intensity window threshold.

The operations to detect a motion state of objects may include, in response to generating a signal that indicates a not jammed state, then reset the time elapsed to zero.

The intensity threshold may be configured to correspond to a predetermined maximum distance from the receiving element.

The intensity threshold may be configured to correspond to a predetermined stationary physical background.

The electromagnetic imaging may include a laser source. The receiving element may include at least one photoelectric sensor.

The monitor system may include an application specific integrated circuit (ASIC). The ASIC may include an interface for connection to the processor. The ASIC may include circuitry for controlling operations of the processor.

In an illustrative aspect, a method for non-contact motion detection configured to detect a motion state of objects may include generate, by a receiving element of an electromagnetic imaging source, an intensity signal (e.g., 515, 615) as a function of an intensity of a reflected electromagnetic signal. The method may include, in response to detecting the reflected electromagnetic signal (e.g., 515, 615), compare the intensity signal to a predetermined intensity threshold (525, 625). The method may include, if the intensity signal is greater than or equal to the intensity threshold, then determine an intensity window metric from a comparison of the intensity threshold with at least one stored intensity value (e.g., 535, 635). The method may include determine if the intensity window metric is greater than a predetermined intensity window threshold (e.g., 540, 640). The method may include, if the intensity window metric is not greater than the intensity window threshold and if a time elapsed since a historic intensity window metric exceeded the intensity window threshold is greater than a predetermined time elapsed threshold (e.g., 545, 645), then, generate a signal that indicates a jam state (e.g., 550, 650).

The method may include generate, by the receiving element, a distance signal from the reflected electromagnetic signal. The method may include, in response to detecting the reflected electromagnetic signal (e.g., 515, 615), compare the distance signal to a predetermined distance threshold (e.g., 525). The method may include, if the distance signal is within the distance threshold (e.g., 525), then generate a signal that indicates a not jammed state (e.g., 505).

The method may include generate, by the receiving element, a distance signal from the reflected electromagnetic signal. The method may include, in response to detecting the reflected electromagnetic signal (e.g., 515, 615), compare the distance signal to a predetermined distance threshold (e.g., 625). The method may include, if the distance signal is outside the distance threshold (e.g., 625), then generate a signal that indicates a not jammed state (e.g., 605).

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A monitor system for non-contact motion detection comprising:
    a processor;
    an electromagnetic imaging source comprising a receiving element configured by the processor to generate an intensity signal as a function of an intensity of a reflected electromagnetic signal; and,
    a data store operatively coupled to the processor and containing instructions that, when executed by the processor, cause the processor to perform operations to detect a motion state of objects, the operations comprising:
        in response to detecting the reflected electromagnetic signal, compare the intensity signal to a predetermined intensity threshold;
        if the intensity signal is greater than or equal to the predetermined intensity threshold, then determine an intensity window metric from a comparison of the intensity threshold with at least one stored intensity value;
        determine if the intensity window metric is greater than a predetermined intensity window threshold; and,
        if the intensity window metric is not greater than the predetermined intensity window threshold and if a time-elapsed-since a historic intensity window metric last exceeded the predetermined intensity window threshold is greater than a predetermined time elapsed threshold, then, generate a signal that indicates a jam state.

2. The monitor system of claim 1, wherein if the reflected electromagnetic signal is not detected and if the time elapsed since the historic intensity window metric exceeded the predetermined intensity window threshold is greater than the predetermined time elapsed threshold, then generate the signal that indicates the jam state.

3. The monitor system of claim 1, wherein if the intensity signal is within the predetermined intensity threshold, then generate a signal that indicates a not jammed state.

4. The monitor system of claim 1, wherein:
    the receiving element is further configured to generate a distance signal from the reflected electromagnetic signal; and,
    the operations further comprising:
        compare the distance signal to a predetermined distance threshold; and,
        if the distance signal is within the distance threshold, then generate a signal that indicates a not jammed state.

5. The monitor system of claim 1, wherein if the intensity signal is outside the predetermined intensity threshold, then generate a signal that indicates a not jammed state.

6. The monitor system of claim 1, wherein:
    the receiving element is further configured to generate a distance signal from the reflected electromagnetic signal; and,
    the operations to detect a motion state of objects further comprising:
        compare the distance signal to a predetermined distance threshold; and,
        if the distance signal is outside the predetermined distance threshold, then generate a signal that indicates a not jammed state.

7. The monitor system of claim 1, wherein if the intensity window metric is outside the predetermined intensity window threshold, then generate a signal that indicates a not jammed state.

8. The monitor system of claim 1, wherein if the time elapsed is less than the predetermined time elapsed threshold, then repeat the operations to detect a motion state of objects.

9. The monitor system of claim 1, wherein if the reflected electromagnetic signal is not detected (615, 620), then generate a signal that indicates a not jammed state.

10. The monitor system of claim 1, further comprising intensity threshold predetermination operations for generating the predetermined intensity threshold, the intensity threshold predetermination operations comprising:
    provide a predetermined object such that an electromagnetic signal launched generates a second reflected electromagnetic signal to the receiver;
    in response to detecting the second reflected electromagnetic signal, determine a first intensity value of the second reflected electromagnetic signal; and,
    generate the predetermined intensity threshold from the determined first intensity value.

11. The monitor system of claim 10, wherein the intensity threshold predetermination operations further comprise:
    determine an intensity value window; and,
    generate the predetermined intensity window threshold.

12. The monitor system of claim 1, further comprising, in response to generating a signal that indicates a not jammed state, then reset the time elapsed to zero.

13. The monitor system of claim 1, wherein the predetermined intensity threshold is configured to correspond to a predetermined maximum distance from the receiving element.

14. The monitor system of claim 1, wherein the predetermined intensity threshold is configured to correspond to a predetermined stationary physical background.

15. The monitor system of claim 1, wherein the electromagnetic imaging source comprises a laser source.

16. The monitor system of claim 1, wherein the receiving element comprises at least one photoelectric sensor.

17. The monitor system of claim 1, further comprising an application specific integrated circuit (ASIC) comprising:
    an interface for connection to the processor, and
    circuitry for controlling operations of the processor.

18. A method for non-contact motion detection configured to detect a motion state of objects, the method comprising:
    generate, by a receiving element of an electromagnetic imaging source, an intensity signal as a function of an intensity of a reflected electromagnetic signal;
    in response to detecting the reflected electromagnetic signal, compare the intensity signal to a predetermined intensity threshold;
    if the intensity signal is greater than or equal to the predetermined intensity threshold, then determine an intensity window metric from a comparison of the predetermined intensity threshold with at least one stored intensity value;
    determine if the intensity window metric is greater than a predetermined intensity window threshold; and,
    if the intensity window metric is not greater than the predetermined intensity window threshold and if a time elapsed since a historic intensity window metric last exceeded the predetermined intensity window threshold is greater than a predetermined time elapsed threshold, then, generate a signal that indicates a jam state.

19. The method of claim 18, further comprising:
generate, by the receiving element, a distance signal from the reflected electromagnetic signal;
in response to detecting the reflected electromagnetic signal, compare the distance signal to a predetermined distance threshold; and,
if the distance signal is within the distance threshold, then generate a signal that indicates a not jammed state.

20. The method of claim 18, further comprising:
generate, by the receiving element, a distance signal from the reflected electromagnetic signal;
in response to detecting the reflected electromagnetic signal, compare the distance signal to a predetermined distance threshold; and
if the distance signal is outside the distance threshold, then generate a signal that indicates a not jammed state.

* * * * *